United States Patent
Nakai

(10) Patent No.: US 12,137,417 B2
(45) Date of Patent: Nov. 5, 2024

(54) COMMUNICATION DEVICE, COMMUNICATION DEVICE CONTROL METHOD, COMMUNICATION METHOD, SERVER, AND COMMUNICATION SYSTEM

(71) Applicant: KYOCERA Corporation, Kyoto (JP)

(72) Inventor: Hiromichi Nakai, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 431 days.

(21) Appl. No.: 17/454,678

(22) Filed: Nov. 12, 2021

(65) Prior Publication Data

US 2022/0078711 A1 Mar. 10, 2022

Related U.S. Application Data

(63) Continuation of application No. PCT/JP2020/020836, filed on May 27, 2020.

(30) Foreign Application Priority Data

May 30, 2019 (JP) .................. 2019-101517
May 30, 2019 (JP) .................. 2019-101537

(51) Int. Cl.
*H04W 52/02* (2009.01)
*G06F 8/65* (2018.01)
(Continued)

(52) U.S. Cl.
CPC .......... *H04W 52/0229* (2013.01); *G06F 8/65* (2013.01); *H04W 8/22* (2013.01); *H04W 24/02* (2013.01)

(58) Field of Classification Search
CPC ... H04W 52/0229; H04W 8/22; H04W 24/02; G06F 8/65
See application file for complete search history.

(56) References Cited

U.S. PATENT DOCUMENTS 4,788,637 A 11/1988 Tamaru
7,872,774 B2 1/2011 Okamoto
(Continued)

FOREIGN PATENT DOCUMENTS

JP S62-76954 A 4/1987
JP 2007-281810 A 10/2007
(Continued)

OTHER PUBLICATIONS

"Lightweight Machine to Machine Technical Specification" Open Mobile Alliance, Feb. 8, 2017, pp. 1-138.

*Primary Examiner* — Erika A Washington
(74) *Attorney, Agent, or Firm* — Studebaker & Brackett PC

(57) ABSTRACT

A communication device 100 includes a communicator 140 configured to perform wireless communication, and a controller 120 configured to switch the communicator 140 to an active state when data communication with a server is initiated by the communicator 140, and to switch the communicator 140 to an inactive state when the data communication is completed. The communicator 140 confirms, during the data communication, whether a firmware update of the communicator 140 is available, and in a case where the firmware update is available, notifies to the controller 120 that the firmware update is available. The controller 120 maintains, in response to receiving, from the communicator 140, notification that the firmware update is available, the communicator 140 in the active state even after the data communication is completed.

9 Claims, 9 Drawing Sheets

(51) Int. Cl.
*H04W 8/22* (2009.01)
*H04W 24/02* (2009.01)

(56) References Cited

U.S. PATENT DOCUMENTS

| | | |
|---|---|---|
| 8,138,945 B2 | 3/2012 | Hayakawa et al. |
| 10,536,290 B2 | 1/2020 | Hagihara |
| 2012/0139750 A1 | 6/2012 | Hayakawa et al. |
| 2018/0102934 A1 | 4/2018 | Ly et al. |
| 2018/0359621 A1* | 12/2018 | Singhal .................. H04L 67/51 |
| 2020/0028946 A1* | 1/2020 | Vora ...................... H04L 1/1874 |
| 2020/0304590 A1* | 9/2020 | Mohalik ............. H04L 67/2895 |

FOREIGN PATENT DOCUMENTS

| | | |
|---|---|---|
| JP | 2008-301071 A | 12/2008 |
| WO | 2017/056206 A1 | 4/2017 |

* cited by examiner

COMMUNICATION DEVICE, COMMUNICATION DEVICE CONTROL METHOD, COMMUNICATION METHOD, SERVER, AND COMMUNICATION SYSTEM

RELATED APPLICATIONS

The present application is a continuation based on PCT Application No. PCT/JP2020/020836, filed on May 27, 2020, which claims the benefit of Japanese Patent Application No. 2019-101517 filed on May 30, 2019, and JP 2019-101537 filed May 30, 2019. The content of which is incorporated by reference herein in their entirety.

TECHNICAL FIELD

The present invention relates to a communication device, a communication device control method, a communication method, a server, and a communication system.

BACKGROUND ART

NPL 1 describes a technical specification for Lightweight Machine to Machine (LwM2M), which is a communication protocol for device management for Internet of Things (IoT) devices.

LwM2M is used, for example, in an application that allows, under the control of an LwM2M server, firmware updates through wireless communication (Firmware updates Over-The-Air (FOTA)) to be performed on LwM2M clients.

Typically, IoT devices are active only during data communication to reduce power consumption and are switched to an inactive state (powered off state or sleep state) when data communication is completed.

LwM2M enables data exchange with a small amount of data for IoT devices. LwM2M also employs a client-server model, and is of a Pull type in which a server acquires data from clients.

CITATION LIST

Non Patent Literature

Non-Patent Document 1: "Lightweight Machine to Machine Technical Specification," Open Mobile Alliance, Internet <URL:http://www.openmobilealliance.org/release/LightweightM2M/V1_0-20170208-A/OMA-TS-LightweightM2M-V1_0-20170208-A.pdf>

SUMMARY

A communication device according to a first aspect includes a communicator configured to perform wireless communication and a controller configured to switch the communicator to an active state when data communication with a server is initiated by the communicator and to switch the communicator to an inactive state when the data communication is completed, wherein the controller is configured to maintain the communicator in the active state even after the data communication is completed in a case where a firmware update is available.

A control method according to a second aspect is a method for controlling a communication device including a communicator configured to perform wireless communication and a controller configured to switch the communicator to an active state when data communication with a server is initiated by the communicator and to switch the communicator to an inactive state when the data communication is completed. The control method includes confirming, by the communicator, during the data communication, whether the firmware update is available, and in a case where the firmware update is available, maintaining, by the controller, the communicator in the active state even after the data communication is completed.

A communication system according to a third aspect includes a server and a communication device. The communication device is configured to perform wireless communication, to switch to an active state when data communication with the server is initiated, and to switch to an inactive state when the data communication is completed. In a case where, during the data communication, a firmware update is available, the communication device maintains the communicator in the active state even after the data communication is completed.

A communication method according to a fourth aspect is a method using a server, a communication device configured to communicate with the server, and a succeeding device electrically connected to the communication device. The communication method includes holding, by the communication device, first data to be notified to the server and second data used to request the server to read the first data, controlling, by the succeeding device, the communication device to change the second data, in a case that the communication device is caused to notify the first data to the server, notifying, by the communication device, the second data to the server when the second data is changed, and by the server, considering, in response to receiving the second data from the communication device, the second data received to be a read request for the first data and transmitting, to the communication device, a read command for reading the first data.

A communication device according to a fifth aspect is used for a communication system including a server, the communication device configured to communicate with the server, and a succeeding device electrically connected to the communication device. The communication device includes a storage configured to hold first data to be notified to the server and second data used to request the server to read the first data, a controller configured to notify, in response to receiving, from the succeeding device, control for changing the second data, the second data to the server when the second data is changed, and a communicator configured to receive a read command for reading the first data from the server that considers the second data to be a read request for the first data.

A server according to a sixth aspect is used for a communication system including the server, a communication device configured to communicate with the server, and a succeeding device electrically connected to the communication device. The server includes a communicator configured to transmit a notification instruction command to the communication device configured to hold first data to be notified to the server and second data used to request the server to read the first data, the notification instruction command instructing notification of the second data to the server when the second data is changed. The communicator is configured to consider, in response to receiving the second data from the communication device, the second data received to be a read request for the first data and to transmit, to the communication device, a read command for reading the first data.

A communication system according to a seventh aspect is a communication system including a server and a communication device configured to communicate with the server.

The communication device includes a storage configured to hold first data to be notified to the server and second data used to request the server to read the first data, a controller configured to notify, in response to receiving, from a succeeding device, control for changing the second data, the second data to the server when the second data is changed, the succeeding device being electrically connected to the communication device, and a first communicator configured to receive a read command for reading the first data from the server. The server includes a second communicator configured to transmit, to the communication device, a notification instruction command instructing notification of the second data to the server when the second data is changed. The second communicator is configured to consider, in response to receiving the second data from the communication device, the second data received to be a read request for the first data, and to transmit, to the communication device, the read command for reading the first data.

DESCRIPTION OF EMBODIMENTS

First Embodiment

Figure 1:
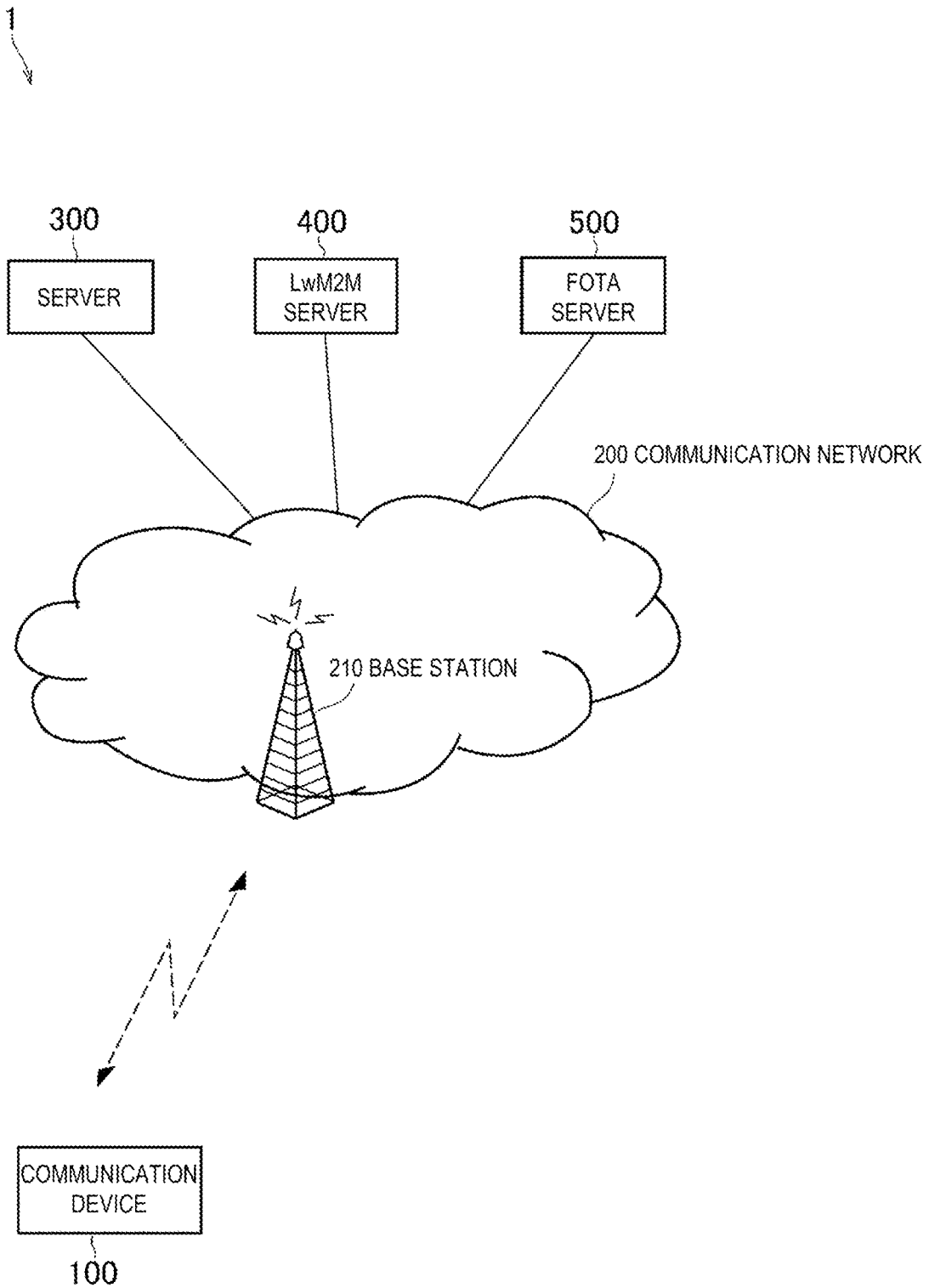
FIG. 1 is a diagram illustrating a configuration of a communication system according to a first embodiment.

LwM2M assumes that an LwM2M client is constantly active. However, even in a case where an LwM2M server transmits, to an IoT device, a request to initiate FOTA, the IoT device fails to receive the request to initiate FOTA while the IoT device is in an inactive state.

In particular, the amount of data transmitted and received by the IoT device is as small as a few bytes, and thus the IoT device may be in the active state for a few seconds, and the LwM2M server has difficulty in causing the IoT device to initiate FOTA within this amount of time.

On the other hand, when the IoT device (LwM2M client) is constantly in the active state, the IoT device consumes an increased amount of power and battery charge remaining is exhausted early, preventing satisfaction of a demand to drive the IoT device for a long time.

Thus, the first embodiment allows, with an increase in power consumption suppressed, the firmware update through wireless communication to be efficiently performed.

Embodiments will be described with reference to the drawings. In the description of the drawings, the same or similar parts are given the same or similar reference numerals.

Configuration of Communication System

First, a configuration of a communication system according to a first embodiment will be described. FIG. 1 is a diagram illustrating a configuration of the communication system 1 according to the first embodiment.

As illustrated in FIG. 1, the communication system 1 includes a communication device 100, a communication network 200, a server 300, an LwM2M server 400, and an FOTA server 500.

The communication device 100 is an IoT device including a wireless communication capability. The communication device 100 is driven by a battery provided in the communication device 100. An example will mainly be described below in which the communication device 100 is a device for placing an order for a specific product with the server 300 in response to depression of a button. However, the communication device 100 may be a device including various sensors and uploading sensor data to the server 300 at a predetermined event or with a predetermined period. The amount of data transmitted to and received from the server 300 by the communication device 100 may be of the order of a few bytes.

For example, the communication device 100 performs Low Power Wide Area (LPWA) scheme-based wireless communication with the communication network 200. The LPWA scheme is a scheme for achieving long-range wireless communication with reduced power consumption. The LPWA scheme is, for example, cellular LPWA, SIGFOX, or LoRaWAN. The cellular LPWA may be enhanced Machine Type Communications (eMTC) or Narrow Band-Internet of Things (NB-IoT) specified in $3^{rd}$ Generation Partnership Project (3GPP) standards.

The communication device 100 is essentially in an inactive state (power-off state or sleep state) in which wireless communication is not performed, and switches from an inactive state to an active state only when wireless communication with the base station 210 is performed, and performs wireless communication. In the inactive state, power supply to the communicator 140 (see FIG. 2) that performs wireless communication can be stopped, thus allowing a battery drive time for the communication device 100 to be extended.

The communication network 200 includes a network provided by a network operator. The communication network 200 may include the Internet. The communication network 200 includes a base station 210 that communicates wirelessly with the communication device 100. FIG. 1 illustrates only one base station 210 included in the communication network 200. However, the communication network 200 includes a plurality of base stations 210.

The server 300 is an apparatus that services the communication device 100 via the communication network 200. The server 300 receives order data for ordering a specific product, from the communication device 100 via the communication network 200, and delivers the ordered product to a user of the communication device 100. Alternatively, the server 300 may receive sensor data from the communication device 100 via the communication network 200 and manage the sensor data received.

The LwM2M server 400 is an apparatus managing a communication device 100, used as an LwM2M client, via the communication network 200 based on the LwM2M standard. The LwM2M server 400 manages firmware updates (FOTA) for the communication device 100.

The FOTA server 500 is an apparatus that delivers firmware to the communication device 100 via the communication network 200. The FOTA server 500 is an example of a firmware delivery server.

Configuration of Communication Device

Figure 2:
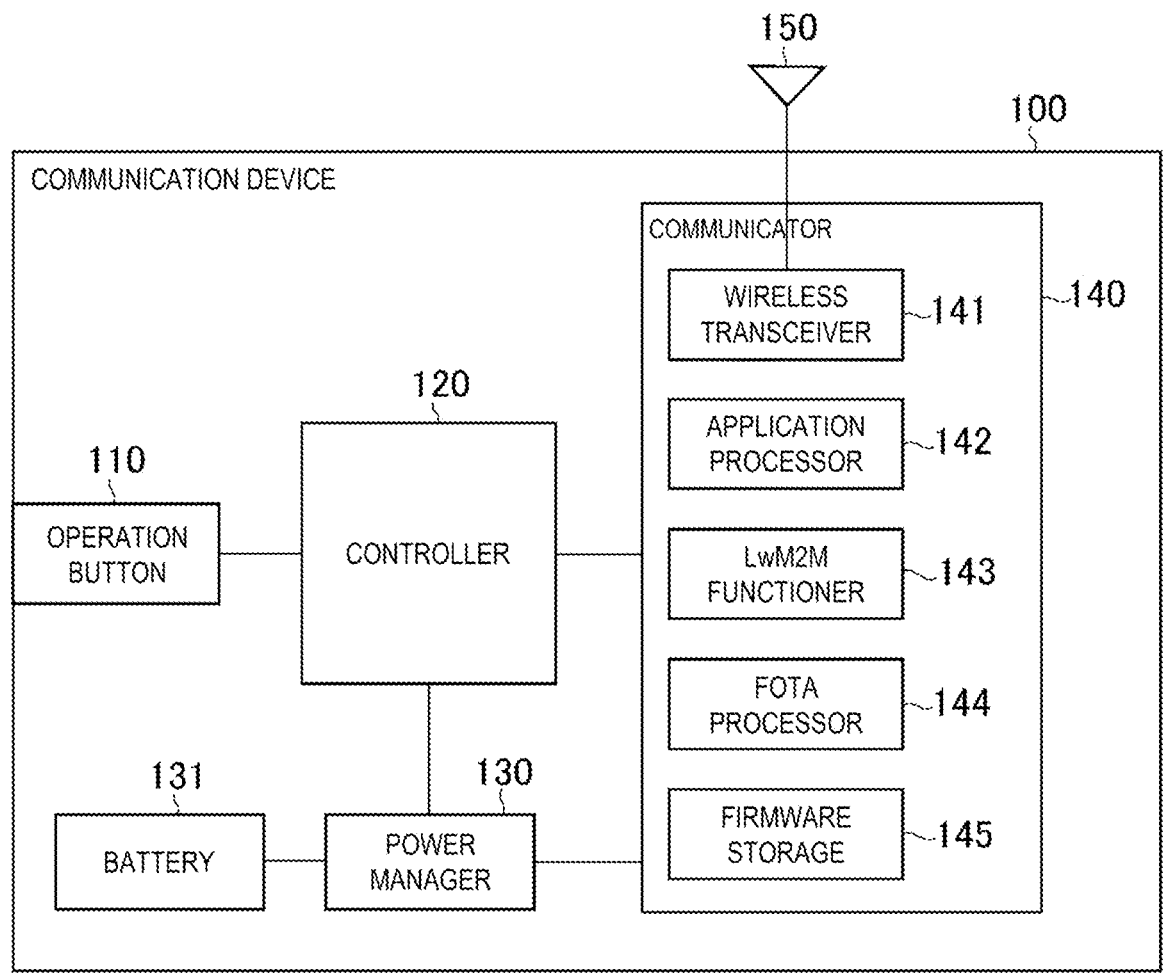
FIG. 2 is a diagram illustrating a configuration of a communication device according to the first embodiment.

Now, a configuration of the communication device 100 according to the first embodiment will be described. FIG. 2 is a diagram illustrating the configuration of the communication device 100.

As illustrated in FIG. 2, the communication device 100 includes an operation button 110, a controller 120, a power manager 130, a battery 131, a communicator 140, and an antenna 150.

The operation button 110 is an example of an operation unit that receives user operations. In response to receiving a depression operation, the operation button 110 outputs, to the controller 120, a signal indicating the depression operation.

The controller 120 controls the communicator 140. The controller 120 includes a microcomputer (so-called microcomputer) having a processor and a memory electrically connected to the processor. The controller 120 is activated in response to a signal output from the operation button 110, activates the communicator 140, and causes the power manager 130 to supply power to the communicator 140.

Specifically, the controller 120 switches the communicator 140 to the active state when the communicator 140 initiates data communication with the server 300, and switches the communicator 140 to the inactive state when the data communication is completed. The inactive state is a state in which the power supply to the communicator 140 is stopped. The inactive state corresponds to a power-off state of the communicator 140. The inactive state may be a sleep state in a Power Saving Mode (PSM).

The power manager 130 manages the power supply from the battery 131 to the controller 120 and the communicator 140. The power manager 130 may constantly supply power to the controller 120. The power manager 130 manages the start and stop of the power supply to the communicator 140 under the control of the controller 120.

The battery 131 is a primary battery or secondary battery that stores power. The battery 131 outputs power to the power manager 130.

The communicator 140 is activated under the control of the controller 120, and performs wireless communication via the antenna 150 in accordance with an LPWA scheme. The antenna 150 is used to transmit and receive radio signals.

The communicator 140 includes a wireless transceiver 141, an application processor 142, an LwM2M functioner 143, an FOTA processor 144, and a firmware storage 145. The wireless transceiver 141 includes a wireless communication circuit, a baseband processor, and the like. The application processor 142, the LwM2M functioner 143, and the FOTA processor 144 each include at least one processor. The firmware storage 145 includes a non-volatile memory.

The wireless transceiver 141 performs amplification processing, filter processing, and the like on a radio signal received by the antenna 150 from the base station 210, converts the radio signal into received data, corresponding to a baseband signal, and demodulates and decodes the received data. The wireless transceiver 141 encodes and modulates transmission data, converts the resultant data into a radio signal, performs amplification processing or the like on the radio signal, and transmits the radio signal from the antenna 150.

The application processor 142 communicates with the server 300 via the wireless transceiver 141 to transmit and receive data to and from the server 300. For example, in response to being notified, from the controller 120, of information indicating that the operation button 110 has been depressed, the application processor 142 generates order data for ordering a specific product, and transmits the order data to the server 300 via the wireless transceiver 141.

Based on the LwM2M standard, the LwM2M functioner 143 communicates with the LwM2M server 400 via the wireless transceiver 141. For example, the LwM2M functioner 143 communicates with the LwM2M server 400 for performing firmware updates.

By communicating with the FOTA server 500 via the wireless transceiver 141, the FOTA processor 144 downloads firmware from the FOTA server 500. The FOTA processor 144 uses the firmware downloaded to update firmware stored in the firmware storage 145.

The firmware storage 145 stores firmware used as a control program for the communicator 140. The firmware is a program that controls at least one of the wireless transceiver 141, the application processor 142, the LwM2M functioner 143, and the FOTA processor 144. The firmware may include a program that controls the controller 120.

Operations of Communication Device

Now, operations of the communication device 100 according to the first embodiment will be described.

(1) General Operation of Communication Device 100

Figure 3:
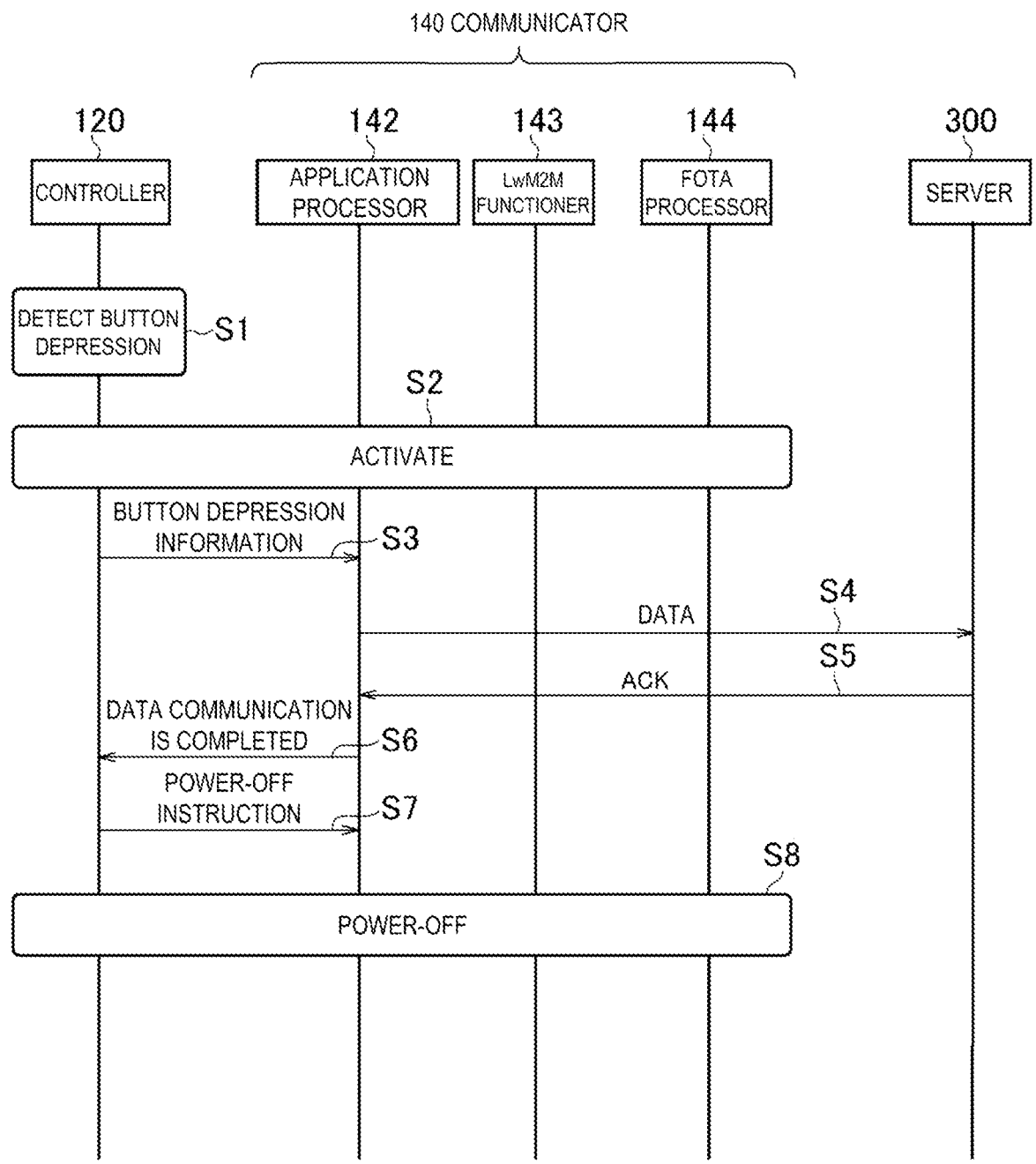
FIG. 3 is a diagram illustrating a general operation of the communication device.

FIG. 3 is a diagram illustrating a general operation of the communication device 100. The operation does not take into account FOTA.

As illustrated in FIG. 3, in step S1, the controller 120 detects a depression operation performed on the operation button 110.

In step S2, in response to detecting the depression operation, the controller 120 activates the communicator 140, and causes the power manager 130 to start power supply to the communicator 140. As a result, the communicator 140 switches from the inactive state (power-off state) to the active state.

In step S3, the controller 120 notifies the application processor 142 of button depression information indicating the depression operation.

In step S4, when the button depression information is notified from the controller 120, the application processor 142 generates data for ordering a specific product, and sends the data to the server 300.

In step S5, the application processor 142 receives, from the server 300, delivery confirmation information (ACK) indicating that the server 300 has correctly received the data.

In step S6, the application processor 142 notifies to the controller 120 that data communication with the server 300 is completed.

In step S7, the controller 120 notifies the application processor 142 of a power-off instruction, and causes the power manager 130 to stop the power supply to the communicator 140.

In step S8, the communicator 140 switches to the inactive state (power-off state).

In this regard, at the time from step S2 to step S8, the communication device 100 (communicator 140) is in the active state.

LwM2M assumes that the LwM2M client is constantly active. Even in a case where the LwM2M server 400 transmits an FOTA initiation request to the communication device 100, the communication device 100 fails to receive the FOTA initiation request while the communication device 100 is in the inactive state. The amount of data transmitted and received by the communication device 100 is as small as a few bytes, and thus the communication device 100 may be in the active state for a few seconds, and the LwM2M server 400 has difficulty in causing the communication device 100 to initiate FOTA within this amount of time.

(2) Modified Operation of Communication Device 100

Figure 4:
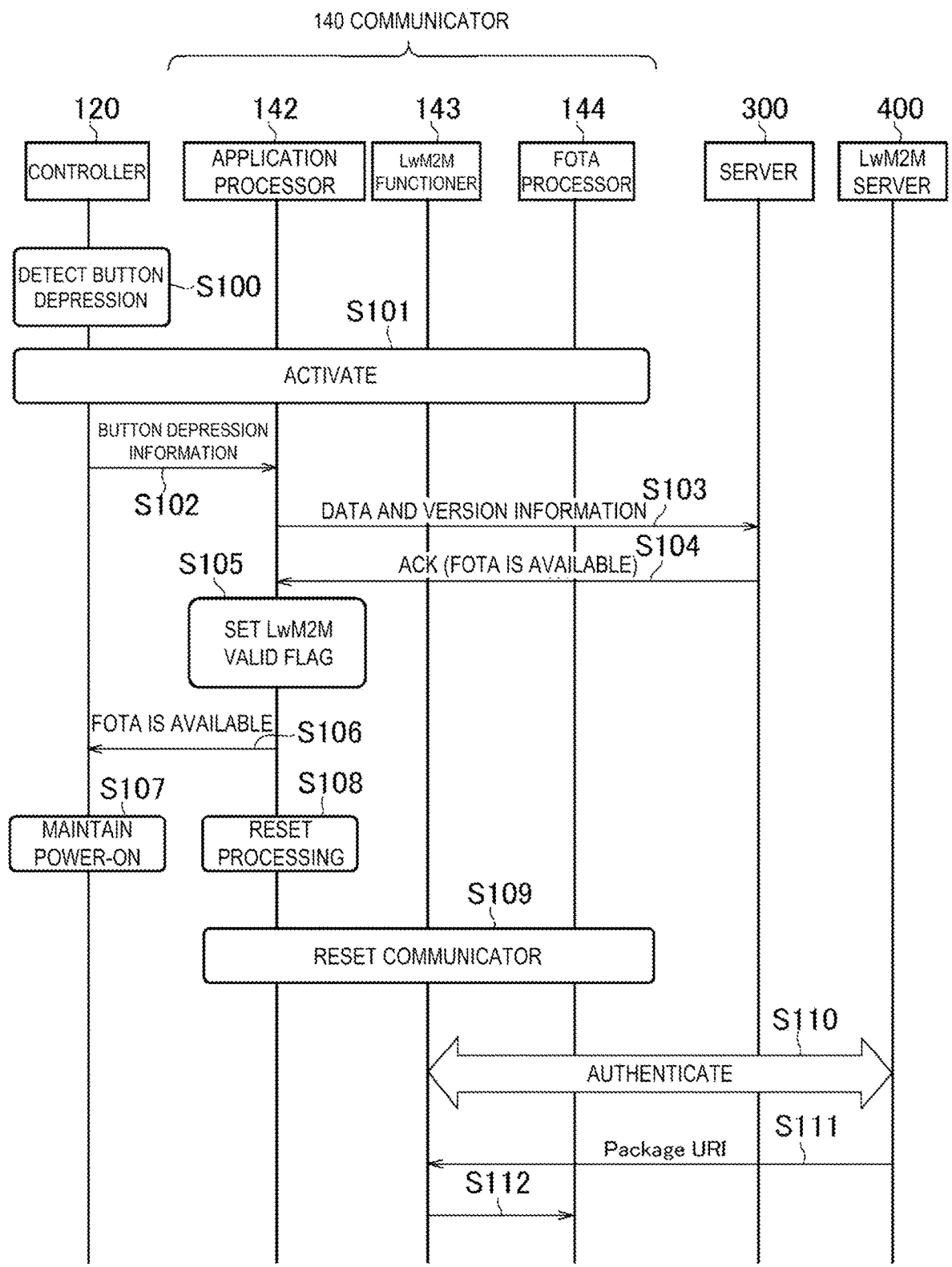
FIG. 4 is a diagram illustrating an operation of the communication device modified to efficiently perform FOTA according to the first embodiment (1).
Figure 5:
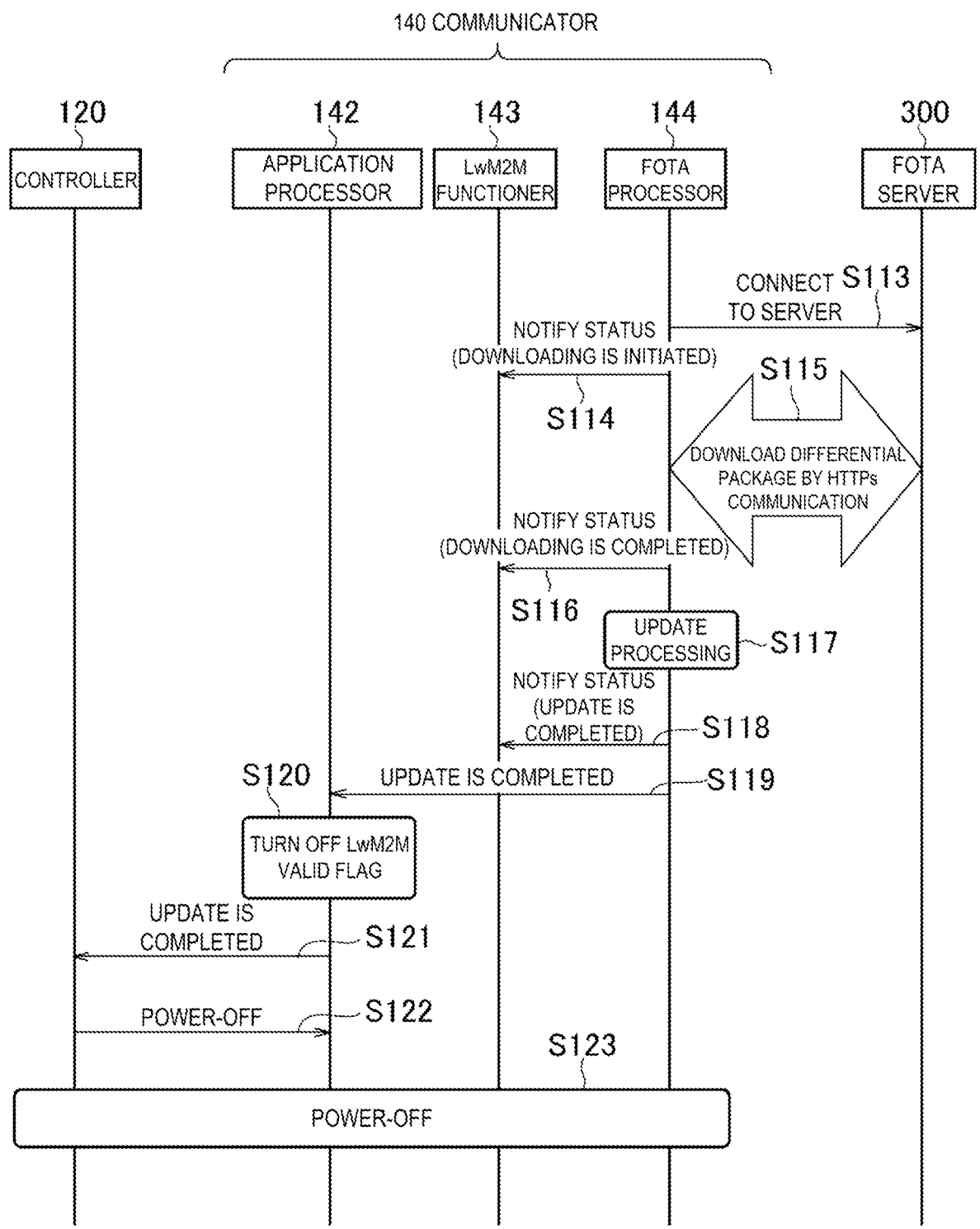
FIG. 5 is a diagram illustrating an operation of the communication device modified to efficiently perform FOTA according to the first embodiment (2).

FIGS. 4 and 5 illustrate an operation of the communication device 100 modified to efficiently perform FOTA.

As illustrated in FIG. 4, in step S100, the controller 120 detects a depression operation performed on the operation button 110.

In step S101, in response to detecting the depression operation, the controller 120 activates the communicator 140, and causes the power manager 130 to start power supply to the communicator 140. As a result, the communicator 140 switches from the inactive state (power-off state) to the active state. In this case, in the communicator 140, the application processor 142 is activated, whereas the LwM2M functioner 143 is not activated.

In step S102, the controller 120 notifies the application processor 142 of button depression information indicating the depression operation.

In step S103, in response to being notified of the button depression information from the controller 120, the application processor 142 generates data for ordering a specific product, and transmits the data to the server 300. The application processor 142 transmits version information (version number) indicating the version of the firmware for the communicator 140, to the server 300 during data communication. The version information is assumed to be stored in the firmware storage 145 along with the firmware.

In step S104, the application processor 142 receives, from the server 300, delivery confirmation information (ACK) indicating that the server 300 has correctly received the data. In addition, the server 300 confirms the version information from the communication device 100, and transmits information indicating whether FOTA is available, to the communication device 100 along with the delivery confirmation information (ACK) for data communication. For example, in a case where the version indicated by the version information from communication device 100 is older than the latest version, the server 300 transmits information indicating that FOTA is available, to the communication device 100 along with the delivery confirmation information (ACK). The application processor 142 confirms whether the firmware update is available based on the FOTA availability information from the server 300. The following description assumes that "FOTA is available" has been notified from the server 300.

In step S105, the application processor 142 sets an LwM2M valid flag (i.e., sets "1" for the flag). The LwM2M valid flag is a flag indicating that the LwM2M functioner 143 needs to be activated after the communicator 140 is reset.

In step S106, the application processor 142 notifies to the controller 120 that the firmware update (FOTA) is available.

In step S107, in response to being notified, from the communicator 140, that the firmware update is available, the controller 120 maintains the communicator 140 in the active state (power-on state) even after the data communication with the server 300 is completed. In other words, the controller 120 does not issue power-off instruction.

In step S108, the application processor 142 resets (initializes) the state of the application processor 142. As a result, the communicator 140 is reset (step S109). Resetting the communicator 140 activates the LwM2M functioner 143 in response to the LwM2M valid flag being set.

In step S110, the LwM2M functioner 143 communicates with the LwM2M server 400 to perform the authentication with the LwM2M server 400. In response to completion of the authentication, the LwM2M server 400 determines that FOTA is needed and notifies the LwM2M functioner 143 of the "Package URI" used to access the FOTA server 500. The LwM2M The functioner 143 notifies the FOTA processor 144 of the "Package URI" (step S112).

As illustrated in FIG. 5, in step S113, the FOTA processor 144 performs processing for connection to the FOTA server 500 based on "Package URI". Additionally, the FOTA processor 144 notifies the LwM2M functioner 143 of initiation of downloading of the firmware (step S114).

In step S115, the FOTA processor 144 uses, e.g., HTTPs communication to download a differential package for the firmware from the FOTA server 500. The differential package is firmware that corresponds to the difference between the old firmware and the latest firmware.

In step S116, the FOTA processor 144 notifies the LwM2M functioner 143 of completion of downloading of the firmware.

In step S117, the FOTA processor 144 uses the firmware downloaded to update the firmware stored in the firmware storage 145.

In steps S118 and S119, the FOTA processor 144 notifies the LwM2M functioner 143 and the application processor 142 of completion of the firmware update.

In step S120, in response to being notified that the firmware update is completed, the application processor 142 turns off the LwM2M valid flag (i.e., sets zero for the flag).

In step S121, the application processor 142 notifies to the controller 120 that the firmware update (FOTA) is completed.

In step S122, in response to being notified that the firmware update is completed, the controller 120 notifies the application processor 142 of the power-off instruction, and causes the power manager 130 to stop the power supply to the communicator 140. As a result, in step S123, the communicator 140 switches to the inactive state (power-off state).

Summary of First Embodiment

As described above, in the communication device 100 according to the first embodiment, the communicator 140 confirms, during data communication, whether a firmware update is available, and in a case where the firmware update is available, notifies to the controller 120 that the firmware update is available. In response to being notified, from the communicator 140, that the firmware update is available, the controller 120 maintains the communicator 140 in the active state even after the data communication is completed.

As described above, even in a configuration where the communicator 140 is active only during data communication to reduce power consumption, confirmation of availability of a firmware update during activation enables the active state to be maintained for the firmware update, allowing the firmware update to be efficiently performed.

In the first embodiment, the communicator 140 transmits the version information indicating the version of the firmware for the communicator 140, to the server 300 during the data communication. In response to receiving, from the server 300, information indicating whether a firmware update is available, the communicator 140 confirms whether the firmware update is available. Thus, the availability of the firmware update can be confirmed during the general operation of the communication device 100, allowing the firmware update to be efficiently performed.

In the first embodiment, in response to notifying the controller 120 that a firmware update is available, the communicator 140 activates the LwM2M function (LwM2M functioner 143) for performing the firmware update, and uses the LwM2M function to communicate with the LwM2M server 400. Thus, the LwM2M functioner 143 is activated exclusively when the firmware update is to be performed, thus enabling a reduction in power consumption compared to a case in which the LwM2M functioner 143 is constantly active.

In the first embodiment, by communicating with the FOTA server 500 based on communication with the LwM2M server 400, the communicator 140 downloads the firmware from the FOTA server 500. This allows the firmware to be appropriately downloaded for FOTA.

In the first embodiment, in response to completion of the firmware update, the communicator 140 notifies to the controller 120 that the firmware update is completed. In response to receiving, from the communicator 140, the notification that the firmware update is completed, the controller 120 switches the communicator 140 from the active state to the inactive state. Thus, the communicator 140 can be switched to the inactive state after confirmation of completion of the firmware update, and thus FOTA can be efficiently performed, with a possible increase in power consumption suppressed.

Second Embodiment

A second embodiment will be described with differences from the first embodiment described above focused on.

There is a need to transmit data from a communication device corresponding to a client to a server at any timing such that the communication device efficiently transmits the data to the server.

However, LwM2M is based on a Pull type in which the server acquires data from the communication device and does not assume that the communication device spontaneously sends data to the server. Thus, the communication device has difficulty in efficiently transmitting data to the server.

Thus, the second embodiment enables efficient data transmission to the server under the assumption of the Pull type in which the server acquires data.

Figure 6:
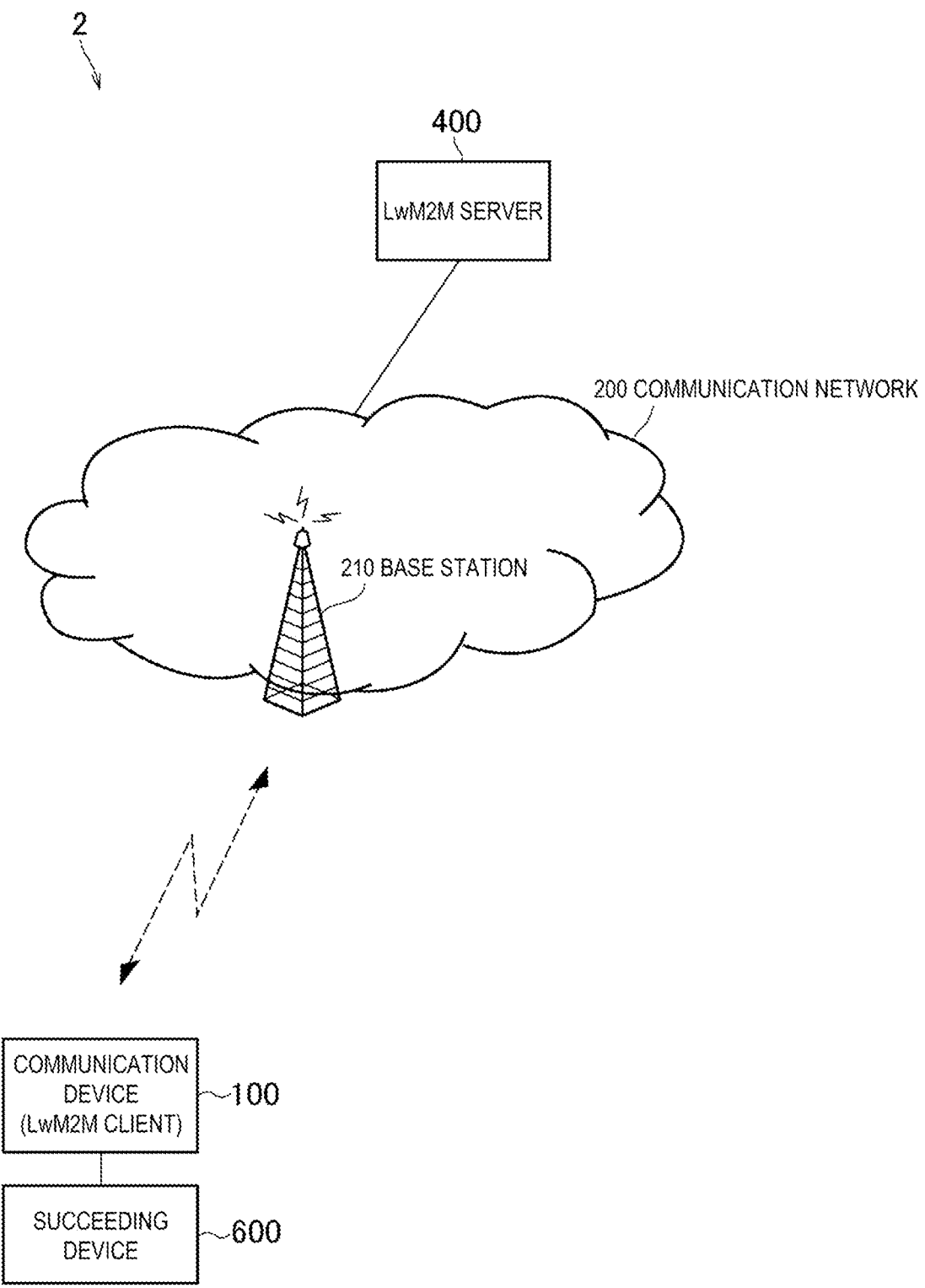
FIG. 6 is a diagram illustrating a configuration of a communication system according to a second embodiment.

The second embodiment will be described with reference to the drawings. In the description of the drawings, the same or similar parts are given the same or similar reference numerals.
Configuration of Communication System First, a configuration of a communication system according to the second embodiment will be described. FIG. 6 is a diagram illustrating the configuration of the communication system 2 according to the second embodiment.

As illustrated in FIG. 6, the communication system 2 includes the communication device 100, a succeeding device 600, the communication network 200, and the LwM2M server 400. The LwM2M server 400 is an example of a server that acquires data from the communication device 100.

The communication device 100 corresponds to an LwM2M client. The communication device 100 is an IoT device including a wireless communication capability. For example, the communication device 100 includes various sensors and uploads data obtained by the sensors to the LwM2M server 400.

The communication device 100 may perform Low Power Wide Area (LPWA) scheme-based wireless communication with the communication network 200. The LPWA scheme is a scheme for achieving long-range wireless communication with reduced power consumption. The LPWA scheme is, for example, cellular LPWA, SIGFOX, or LoRaWAN. The cellular LPWA may be enhanced Machine Type Communications (eMTC) or Narrow Band-Internet of Things (NB-IoT) specified in $3^{rd}$ Generation Partnership Project (3GPP) standards.

The succeeding device 600 is a device electrically connected to the communication device 100. The succeeding device 600 is connected directly to the communication device 100 or connected indirectly to the communication device 100 via a cable. The succeeding device 600 performs e.g., Universal Asynchronous Receiver/Transmitter (UART) scheme or Universal Serial Bus (USB) scheme-based wired communication with the communication device 100.

The succeeding device 600 is a device such as a Personal Computer (PC), sensor instrument, meter instrument, or automatic vending machine. The succeeding device 600 executes an application for IoT. The succeeding device 600 connected with the communication device 100 can communicate with the communication network 200 and the LwM2M server 400 via the communication device 100 even in a case where the succeeding device 600 includes no wireless communication capability.

The communication network 200 includes a network provided by a network operator. The communication network 200 may include the Internet. The communication network 200 includes a base station 210 that communicates wirelessly with the communication device 100. FIG. 6 illustrates only one base station 210 included in the communication network 200. However, the communication network 200 includes a plurality of base stations 210.

The LwM2M server 400 manages the communication device 100 corresponding to an LwM2M client, via the communication network 200 based on the LwM2M standard. LwM2M employs a client-server model, and the LwM2M server 400 performs Pull type acquisition in which the LwM2M server 400 acquires data from the communication device 100 corresponding to an LwM2M client.

The LwM2M server 400 transmits, to the communication device 100, mainly four commands described below.
1) Read:
   Read command for acquiring data from the communication device 100.
2) Write:
   Write command for writing data and parameters to the communication device 100.
3) Execute:
   Execution command for causing the communication device 100 to perform processing such as re-activation.
4) Observe:
   Notification instruction command that corresponds to an expanded version of the Read command and that instructs notification, to the LwM2M server 400, of data specified by the LwM2M server 400 at a timing when the data is changed or at specified time intervals.

Note that, in the communication system 2, lifetime is held by both the LwM2M server 400 and the communication device 100 in consideration of a state in which the communication device 100 fails to communicate. The state in which the communication device 100 fails to communicate refers to, for example, a state in which the communication device 100 is outside of the range, a state in which the communication device 100 is in the sleep mode to reduce power consumption, and the like. The communication device 100 extends the lifetime by updating registration (Update) in the LwM2M server 400 before the lifetime ends.

Three messages described below are transmitted from the communication device 100 to the LwM2M server 400.

1) Register:
Registration request message for the first registration in the LwM2M server 400
2) Update:
Update request message for extension of the lifetime
3) Notify:
Notification message corresponding to the Observe command and notifying data.

The communication device 100 transmits, to the LwM2M server 400, the Register message and the Update message assigned several parameters. The parameters are, for example, the lifetime described above, the numbers of objects supported, and the like.

Note that the communication device 100 manages data in the form of a resource model. The resource model is a tree structure of objects, object instances, and resources. The elements are assigned the respective numbers. For example, a resource representing the manufacturer of the device is represented as /3/0/0, meaning the third object, the zeroth object instance, and the zeroth resource. In response to receiving, from the LwM2M server 400, the Read command specifying /3/0/0, the communication device 100 returns the manufacturer data of the communication device 100 to the LwM2M server 400.

Configuration of Communication Device

Figure 7:
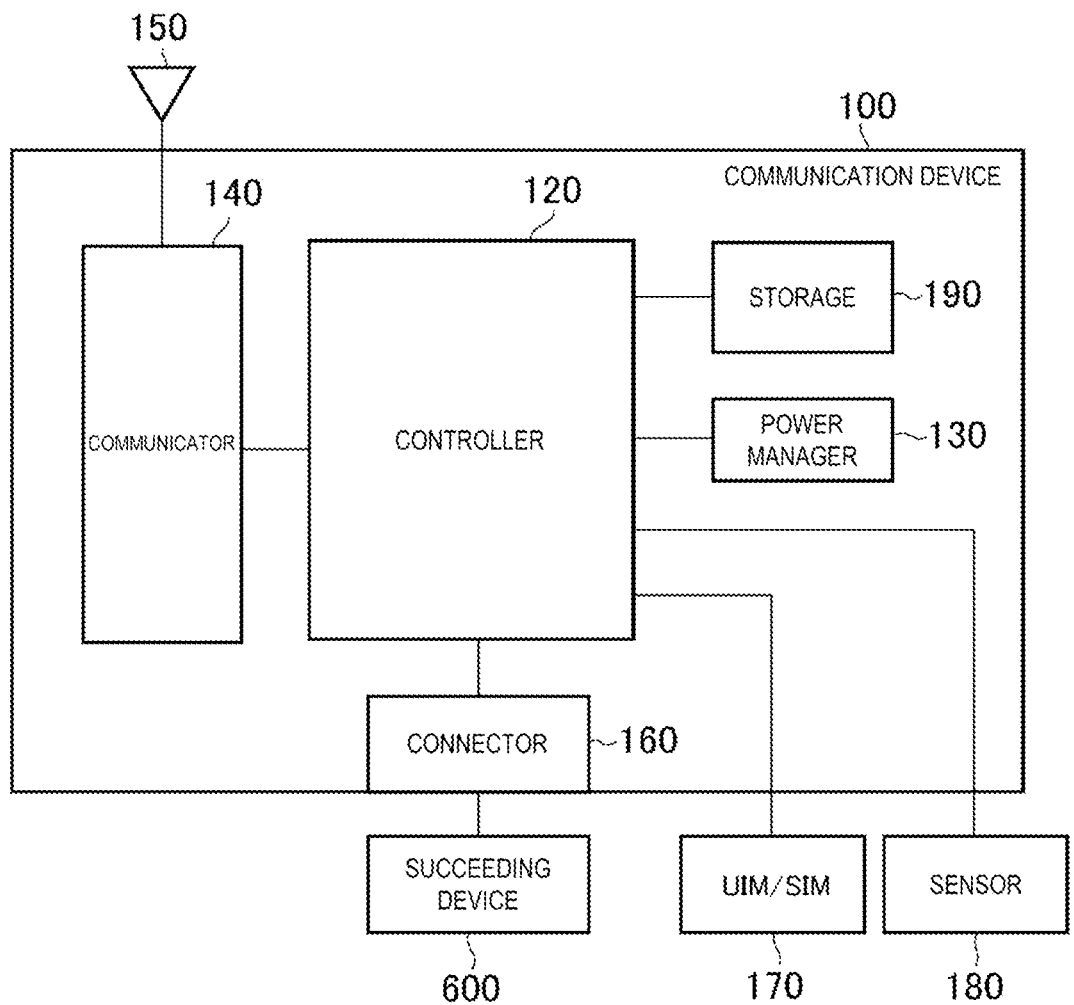
FIG. 7 is a diagram illustrating a configuration of a communication device according to the second embodiment.

Now, a configuration of the communication device 100 according to the second embodiment will be described. FIG. 7 is a diagram illustrating a configuration of the communication device 100 according to an embodiment.

As illustrated in FIG. 7, the communication device 100 includes the antenna 150, the communicator 140, the controller 120, a storage 190, the power manager 130, and a connector 160. The communication device 100 can connect to a UIM/SIM 170 and a sensor 180 via an interface not illustrated.

The antenna 150 is used to transmit and receive radio signals. The communicator 140 communicates wirelessly with the base station 210 under the control of the controller 120, and communicates with the LwM2M server 400 via the base station 210. The communicator 140 performs amplification processing, filter processing, and the like on a radio signal received by the antenna 150 from the base station 210, converts the radio signal into a baseband signal, and outputs the baseband signal to the controller 120. The communicator 140 converts the baseband signal input from the controller 120 into a radio signal, performs amplification processing and the like on the radio signal, and transmits the resultant signal from the antenna 150.

The communicator 140 performs LwM2M standard based communication with the LwM2M server 400. For example, the communicator 140 receives any of the Read command, the Write command, the Execute command, and the Observe command from the LwM2M server 400. The communicator 140 transmits any of the Register message, the Update message, and the Notify message to the LwM2M server 400.

The controller 120 performs various types of processing and control for the communication device 100. For example, the controller 120 controls and causes the communicator 140 to communicate wirelessly with the base station 210 in accordance with the LPWA scheme. The controller 120 includes at least one processor. The processor may include a baseband processor and a central processing unit (CPU). The baseband processor performs modulation and demodulation, and coding and decoding of a baseband signal, and the like. The CPU executes the programs stored in the storage 190 to perform various types of processing.

The controller 120 performs processing based on the LwM2M standard. For example, in response to reception, by the communicator 140, of any of the Read command, the Write command, the Execute command, and the Observe command, the controller 120 performs processing corresponding to the command received. Additionally, the controller 120 generates any of the Register message, the Update message, and the Notify message, and outputs the message generated to the communicator 140. The controller 120 manages the lifetime, and extends the lifetime by updating registration (Update) in the LwM2M server 400 before the lifetime ends.

The storage 190 includes a volatile memory and a non-volatile memory, and stores programs executed by the controller 120, and information and data used for processing by the controller 120.

The power manager 130 includes a battery and peripheral circuitry for the battery. The power manager 130 supplies drive power for the communication device 100. Note that in a case where the communication device 100 is connected to the succeeding device 600 via USB, the drive power may be supplied by the succeeding device 600 through USB power supply.

The connector 160 is an interface for electrically connecting to the succeeding device 600. With the succeeding device 600 electrically connected to the connector 160, the controller 120 executes transfer processing for data transmitted to and received from the communication network 200 by the succeeding device 600.

The UIM/SIM 170 stores subscriber information needed to communicate with the communication network 200, and the like.

The sensor 180 includes a plurality of types of sensors, and measures temperature, humidity, atmospheric pressure, illuminance, acceleration, and/or geomagnetic fields to output data including the measurement values. The data output by the sensor 180 is stored in the storage 190 via the controller 120. The controller 120 manages data stored in the storage 190.

Configuration of LwM2M Server

Figure 8:
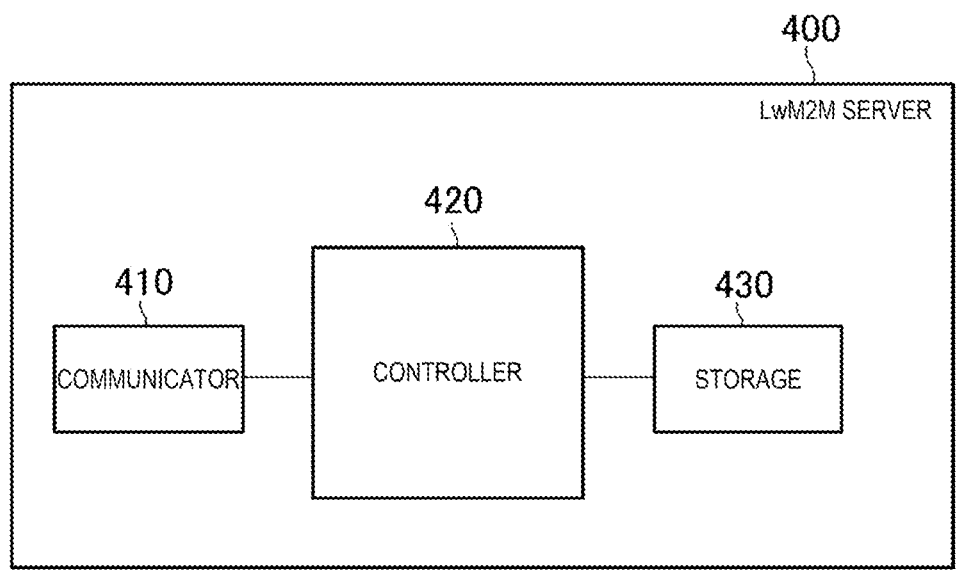
FIG. 8 is a diagram illustrating a configuration of an LwM2M server according to the second embodiment.

Now, a configuration of the LwM2M server 400 according to the second embodiment will be described. FIG. 8 is a diagram illustrating the configuration of the LwM2M server 400.

As illustrated in FIG. 8, the LwM2M server 400 includes a communicator 410, a controller 420, and a storage 430.

The communicator 410 is connected by wire or wirelessly to the communication network 200. The communicator 410 communicates with the LwM2M server 400 via the communication network 200 under the control of the controller 420.

The communicator 410 communicates with the communication device 100 based on the LwM2M standard. For example, the communicator 410 transmits any of the Read command, the Write command, the Execute command, and the Observe command to the communication device 100. The communicator 410 receives any of the Register message, the Update message, and the Notify message from the communication device 100.

The controller 420 performs various types of processing and control for the LwM2M server 400. The controller 420 includes at least one processor. The processor executes the programs stored in the storage 430 to perform various types of processing.

The controller 420 performs processing based on the LwM2M standard. For example, in response to reception, by the communicator 410, of any of the Register message, the Update message, and the Notify message, the controller 420 performs processing corresponding to the message received. In addition, the controller 420 generates any of the Read command, the Write command, the Execute command, and the Observe command, and outputs the message generated to the communicator 410.

The storage 430 includes a volatile memory and a non-volatile memory, and stores programs executed by the controller 420, and information and data used for processing by the controller 420.

Operations of Communication System

Now, operations of the communication system 2 according to the second embodiment will be described.

The communication system 2 is based on the Pull type in which the LwM2M server 400 acquires data from the communication device 100, and it is difficult to transmit desired data from the communication device 100 to the LwM2M server 400 at any timing.

In particular, in a case where the succeeding device 600 is to cause the communication device 100 to notify of the desired data to the LwM2M server 400, the communication device 100 fails to be caused to notify of the desired data to the LwM2M server 400 unless the LwM2M server 400 issues the Read command for the desired data.

Thus, the Notify message is utilized to allow the Notify message to prompt the LwM2M server 400 to issue the Read command. Such a communication method will be described below.

Figure 9:
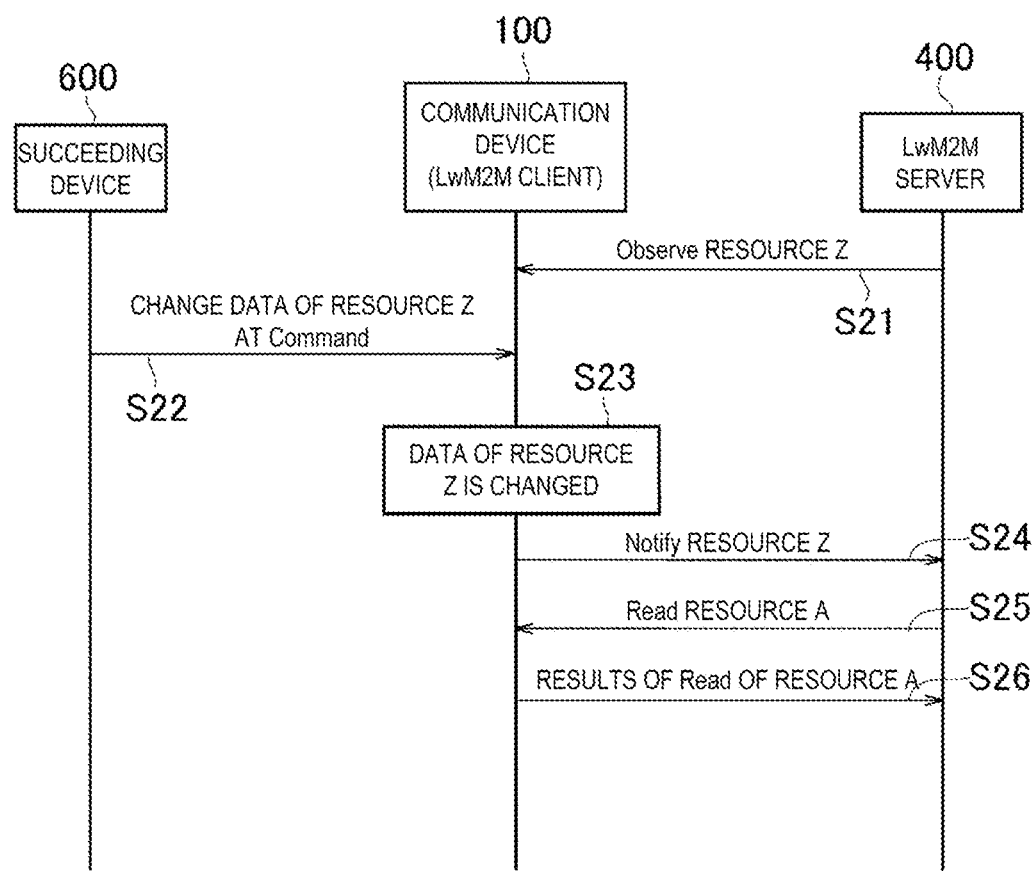
FIG. 9 is a sequence diagram illustrating a communication method according to the second embodiment.

FIG. 9 is a sequence diagram illustrating a communication method according to the second embodiment. The communication method according to the second embodiment is a method using the LwM2M server 400, the communication device 100 communicating with the LwM2M server 400, and the succeeding device 600 electrically connected to the communication device 100.

Before the sequence illustrated in FIG. 9, the storage 190 of the communication device 100 holds first data to be notified to the LwM2M server 400 and second data used to request the LwM2M server 400 to read the first data.

In FIG. 9, an example is illustrated in which the first data is the data of a resource A and the second data is the data of a resource Z. Note that the succeeding device 600 and the LwM2M server 400 recognize and hold the correspondence relationship between the first data (resource A) and the second data (resource Z) in advance.

Step S21:

In the LwM2M server 400, the controller 420 generates an Observe command instructing notification of the second data (resource Z) to the LwM2M server 400 in response to a change in the second data (resource Z). The Observe command includes the identifier of the second data (resource Z). The communicator 410 transmits, to the communication device 100, the Observe command generated by the controller 420.

In the communication device 100, the communicator 140 receives the Observe command from the LwM2M server 400. The controller 120 initiates monitoring of the second data (resource Z) based on the Observe command received by the communicator 140.

Step S22:

In a case where the succeeding device 600 causes the communication device 100 to notify of the first data (resource A) to the LwM2M server 400, the succeeding device 600 controls and causes the communication device 100 to change the second data (resource Z). For example, the succeeding device 600 generates an AT Command that changes the second data (resource Z), and outputs the AT Command generated to the communication device 100.

Step S23:

In the communication device 100, in response to receiving the AT Command from the succeeding device 600 via the connector 160, the controller 120 changes the first data (resource A) based on the AT Command.

Step S24:

In the communication device 100, the controller 120 determines, in response to issuance of the Observe command for the first data (resource A), that a change in the first data (resource A) has led to a need to notify of the first data (resource A) to the LwM2M server 400, and generates a Notify message including the changed first data (resource A). The Notify message includes the second data (resource Z) and the identifier of the second data. The communicator 140 transmits, to the LwM2M server 400, the Notify message generated by the controller 120.

Step S25:

In the LwM2M server 400, the communicator 410 receives the Notify message from communication device 100. In response to reception, by the communicator 410, of the Notify message including the second data (resource Z) and the identifier of the second data, the controller 420 considers the Notify message as a read request for the first data (resource A) and generates a Read command for reading the first data (resource A). The Read command includes the identifier of the first data (resource A). Then, the communicator 410 transmits, to the communication device 100, the Read command generated by the controller 420.

In the communication device 100, the communicator 140 receives the Read command from LwM2M server 400.

Step S26:

In response to reception, by the communicator 140, of the Read command for the first data (resource A), the controller 120 acquires the first data (resource A) from the storage 190. The communicator 140 transmits the first data (resource A) to the LwM2M server 400.

As described above, in accordance with the LwM2M standard based on the Pull type in which the LwM2M server 400 reads data from the communication device 100, the communication method according to the second embodiment allows the desired data to be transmitted from the communication device 100 to the LwM2M server 400 at any timing by using the succeeding device 600 as a starting point. This enables efficient data transmission to the LwM2M server 400.

Other Embodiments

In the first embodiment described above, an example has been described in which the communication system 1 includes three servers: the server 300, the LwM2M server 400, and the FOTA server 500. However, the servers may be further subdivided or two or more of the servers may be integrated together.

Additionally, in the first embodiment described above, an example has been mainly described in which the communication device 100 is a device for ordering a specific product with the server 300 in response to button depression.

However, the communication device 100 may be a sensor device including various sensors.

In the first embodiment described above, an example has been described in which data is uploaded from the communication device 100 to the server 300. However, the communication device 100 may download the data from the server 300.

In the second embodiment described above, an example has been described in which the communication device 100 communicates with the LwM2M server 400 by wireless communication. However, the communication device 100 may communicate with the LwM2M server 400 by wired communication.

Additionally, in the second embodiment described above, the communication system 2 based on the LwM2M standard has been described. However, any standard or protocol may be used that is based on the Pull type in which a server acquires data from a communication device, and no limitation to the LwM2M standard is intended.

A program may be provided that causes a computer to execute each of the processing performed by the communication device 100 or the LwM2M server 400. The program may be recorded on a computer readable medium. The program can be installed in a computer by using the computer readable medium. Here, the computer readable medium on which the program is recorded may be a non-transitory recording medium. Although the non-transitory recording medium is not limited to a particular one, a recording medium, for example, a CD-ROM, a DVD-ROM, or the like may be adopted. In addition, the functioners (circuits) for executing the processing performed by the communication device 100 may be integrated, and the communication device 100 may be configured as a semiconductor integrated circuit (a chipset or an SoC).

Embodiments have been described above in detail with reference to the drawings, but specific configurations are not limited to those described above, and various design modifications can be made without departing from the gist of the present disclosure.

The invention claimed is:

1. A communication device for use in a communication system comprising a server, the communication device configured to communicate with the server, and a succeeding device electrically connected to the communication device, the communication device comprising:
a storage configured to hold first data to be notified to the server and second data used to request the server to read the first data;
a controller configured to notify, in response to receiving, from the succeeding device, control for changing the second data, the second data to the server when the second data is changed; and
a communicator configured to receive a read command for reading the first data from the server that considers the second data to be a read request for the first data.

2. The communication device according to claim 1, wherein
the second data is different data than the first data.

3. The communication device according to claim 2, further comprising:
an interface which is electrically connected to the succeeding device, and is configured to receive control for changing the second data from the succeeding device.

4. A communication system comprising a server and a communication device configured to communicate with the server, wherein
the communication device comprises:
a storage configured to hold first data to be notified to the server and second data used to request the server to read the first data;
a controller configured to notify, in response to receiving, from a succeeding device, control for changing the second data, the second data to the server when the second data is changed, the succeeding device being electrically connected to the communication device; and
a first communicator configured to receive a read command for reading the first data from the server, wherein
the server includes a second communicator configured to transmit, to the communication device, a notification instruction command instructing notification of the second data to the server when the second data is changed, and
the second communicator is configured to consider, in response to receiving the second data from the communication device, the second data received to be a read request for the first data, and to transmit, to the communication device, the read command.

5. The communication system according to claim 4, wherein
based on the notification instruction command, the communication device notifies the second data to the server when the second data is changed.

6. The communication system according to claim 5, wherein
the notification instruction command is an Observe command defined in the LwM2M standard.

7. The communication system according to claim 4, wherein
the read command is a Read command defined in the LwM2M standard.

8. The communication system according to claim 4, wherein
the second data is different data than the first data.

9. The communication system according to claim 8, wherein
the communication device further comprises:
an interface which is electrically connected to the succeeding device, and is configured to receive control for changing the second data from the succeeding device.

* * * * *